(12) United States Patent
Schimpf et al.

(10) Patent No.: US 6,784,894 B2
(45) Date of Patent: Aug. 31, 2004

(54) MAPPING TIME-SORTED TO DIRECTION-SORTED TRIANGLE VERTICES

(75) Inventors: Michael W. Schimpf, Pacific Grove, CA (US); Michael G. Lavelle, Saratoga, CA (US); Mark E. Pascual, San Jose, CA (US); Nandini Ramani, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 327 days.

(21) Appl. No.: 09/861,176

(22) Filed: May 18, 2001

(65) Prior Publication Data

US 2002/0024522 A1 Feb. 28, 2002

Related U.S. Application Data

(60) Provisional application No. 60/227,716, filed on Aug. 24, 2000.

(51) Int. Cl.[7] .............................................. G06T 15/00
(52) U.S. Cl. ........................ 345/581; 345/419; 345/418; 345/589; 345/601; 345/602; 345/606
(58) Field of Search ................................. 345/581, 582, 345/589, 601, 606–610, 441–443, 418–419

(56) References Cited

U.S. PATENT DOCUMENTS

| | | | | |
|---|---|---|---|---|
| 5,343,558 A | * | 8/1994 | Akeley | 345/426 |
| 5,347,618 A | * | 9/1994 | Akeley | 345/421 |
| 5,392,385 A | * | 2/1995 | Evangelisti et al. | 345/611 |
| 5,446,836 A | * | 8/1995 | Lentz et al. | 395/141 |
| 5,671,401 A | * | 9/1997 | Harrell | 345/505 |
| 5,852,446 A | * | 12/1998 | Hashimoto et al. | 345/441 |
| 5,945,997 A | * | 8/1999 | Zhao et al. | 345/581 |
| 6,034,699 A | * | 3/2000 | Wong et al. | 345/441 |
| 6,160,557 A | * | 12/2000 | Narayanaswami | 345/422 |
| 6,166,717 A | * | 12/2000 | Nakayama | 345/611 |
| 6,529,196 B1 | * | 3/2003 | Holt | 345/443 |
| 6,624,823 B2 | * | 9/2003 | Deering | 345/613 |

OTHER PUBLICATIONS

"Triangle Rasterization, Setup" web page from Mar. 24, 1998, 20 pages.

Michael F. Deering, "Graphics System Determining Triangle Orientation By Edge Sign Bits and Slope Comparison," Provisional Patent Application Ser. No. 60/231,669, filed Sep. 11, 2000.

Michael F. Deering, "Graphics System With A Variable–Resolution Sample Buffer," Patent Application Ser. No. 09/251,840, filed Feb. 17, 1999.

Michael F. Deering, Ranjit Oberoi and Marc Tremblay, "UltraJava Graphics," Provisional Patent Application Ser. No. 60/074,836, filed Feb. 17, 1998.

* cited by examiner

Primary Examiner—Michael Razavi
Assistant Examiner—Daniel Chung
(74) Attorney, Agent, or Firm—Meyertons Hood Kivlin Kowert & Goetzel, P.C.; Jeffrey C. Hood; Mark K. Brightwell

(57) ABSTRACT

A graphics system configured to operate on a collection of vertices to determine mappings from an initial order to secondary and tertiary ordering. The initial order corresponds to the ordering of the vertices in an input buffer. The secondary (tertiary) ordering corresponds to the ordering of the vertices along a triangle major (minor) axis. The graphics system computes horizontal and vertical displacements along edges of the triangle in the initial ordering, and uses the signs of the horizontal displacements and vertical displacements to access a mapping table which determines the mappings. The mappings may be used to rasterize the triangle in terms of pixels (or samples).

20 Claims, 14 Drawing Sheets

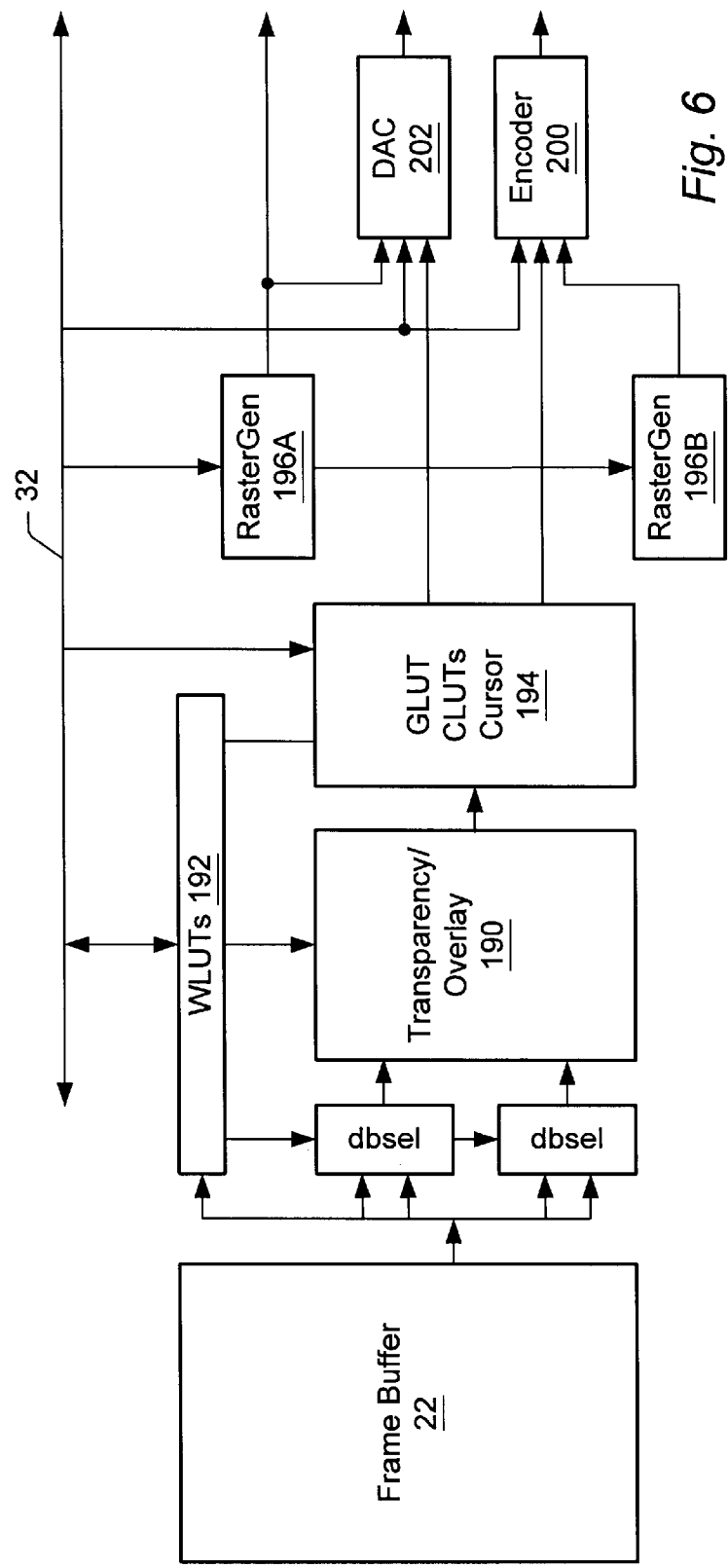

Major Axis Mapping Code Table

| [dJ$_{12}$] | [dJ$_{13}$] | [dJ$_{23}$] | S | M | E | E$_{SM}$ | E$_{SE}$ | E$_{ME}$ | T2J |
|---|---|---|---|---|---|---|---|---|---|
| 0 | 0 | 0 | 1 | 2 | 3 | E$_{12}$ | E$_{13}$ | E$_{23}$ | 000 |
| 0 | 1 | 1 | 3 | 1 | 2 | E$_{31}$ | E$_{32}$ | E$_{12}$ | 100 |
| 0 | 0 | 1 | 1 | 3 | 2 | E$_{13}$ | E$_{12}$ | E$_{32}$ | 001 |
| 1 | 1 | 1 | 3 | 2 | 1 | E$_{32}$ | E$_{31}$ | E$_{21}$ | 101 |
| 1 | 0 | 0 | 2 | 1 | 3 | E$_{21}$ | E$_{23}$ | E$_{13}$ | 011 |
| 1 | 1 | 0 | 2 | 3 | 1 | E$_{23}$ | E$_{21}$ | E$_{31}$ | 010 |
| 0 | 1 | 0 | | | | | | | |
| 1 | 0 | 1 | | | | | | | |

Fig. 8

Minor Axis Mapping Code Table

| [dN₁₂] | [dN₁₃] | [dN₂₃] | H | C | T | $E_{HC}$ | $E_{HT}$ | $E_{CT}$ | T2N |
|---|---|---|---|---|---|---|---|---|---|
| 0 | 0 | 0 | 1 | 2 | 3 | $E_{12}$ | $E_{13}$ | $E_{23}$ | 000 |
| 0 | 1 | 1 | 3 | 1 | 2 | $E_{31}$ | $E_{32}$ | $E_{12}$ | 100 |
| 0 | 0 | 1 | 1 | 3 | 2 | $E_{13}$ | $E_{12}$ | $E_{32}$ | 001 |
| 1 | 1 | 1 | 3 | 2 | 1 | $E_{32}$ | $E_{31}$ | $E_{21}$ | 101 |
| 1 | 0 | 0 | 2 | 1 | 3 | $E_{21}$ | $E_{23}$ | $E_{13}$ | 011 |
| 1 | 1 | 0 | 2 | 3 | 1 | $E_{23}$ | $E_{21}$ | $E_{31}$ | 010 |
| 0 | 1 | 0 | | | | | | | |
| 1 | 0 | 1 | | | | | | | |

Fig. 9

MAPPING TIME-SORTED TO DIRECTION-SORTED TRIANGLE VERTICES

CROSS-REFERENCE TO RELATED APPLICATIONS

This application claims benefit of U.S. Provisional Application Serial No. 60/227,716 filed on Aug. 24, 2000 titled "Interpolating Sample Values from Known Triangle Vertex Values".

BACKGROUND OF THE INVENTION

1. Field of the Invention

This invention relates generally to the field of computer graphics and, more particularly, to high performance graphics systems for rendering graphical objects based on a decomposition of the graphical objects into triangles.

2. Description of the Related Art

A graphics system may be configured to receive a stream of vertices from a host application executing on a host computer. The vertices specify triangles in a 3D coordinate space. The triangles represent a collection of 3D objects in the 3D world coordinate space. The graphics system may operate on the triangles to generate a video stream which represents the view of a virtual camera (or virtual observer) in the 3D world coordinate space. In particular, the graphics system may compute color values for each pixel that resides within each triangle (i.e. the two-dimensional footprint of the triangle in screen space). This process of assigning color values to pixels (or samples) internal to triangles is referred to herein as triangle rasterization.

Each triangle is defined by three vertices. Each vertex comprises a coordinate pair (X,Y), a color vector and texture coordinates. One prior art method for rasterizing a triangle operates by walking along horizontal scan lines from a left edge to a right edge of the triangle. Within a scan line, color values for successive pixels may be generated by repeated addition of pixel increment values (one pixel increment value per color). Successive scan lines may be processed in the order of increasing Y coordinate (i.e. the vertical screen space coordinate) until the entire triangle is covered. Thus, it is important to identify the vertex with the smallest Y coordinate and the vertex with the largest Y coordinate.

It is noted that the identity of the left edge or the right edge may change through the rasterization process. For example, given a triangle with vertices $V_A=(0,0)$, $V_B=(10,10)$ and $V_C=(0,20)$, it is observed that edge $V_AV_B$ will be the right edge for scan lines having Y coordinate less than 10, and edge VBVC will be the right edge for scan lines having Y coordinate greater than 10. Thus, for a generic triangle, it is important to identify the vertices having minimum, maximum and intermediate Y coordinates values. The minimum and maximum Y coordinates define the first and last scan lines, and the intermediate Y coordinate defines where an edge boundary change will occur.

The portion of a scan line that intersects the triangle is referred to as a span. Each span is bounded by a left boundary point on a left edge and a right boundary point on a right edge of the triangle. The X coordinates of the left (right) boundary points for successive spans may be computed by repeatedly adding a left (right) edge increment starting with the X coordinate of the vertex $V_A$. The left (right) edge increment may equal the slope $(\Delta X/\Delta Y)$ of the left (right) edge. Thus, the slopes of the left and right edges are computed before the spans are processed.

Observe that an edge slope may attain a large magnitude if its Y displacement $\Delta Y$ is small relative to its X displacement $\Delta X$. Thus, it may be necessary to assign a large number of bits to the slope variables.

One drawback of the above triangle rasterization method is that tall skinny triangles may not be handled efficiently. A tall skinny triangle intercepts a large number of scan lines, but each scan line may have only a few pixels. Thus, a significant portion of the rasterization time may be consumed in the overhead of generating successive scan lines.

The manufacturers of 3D graphics systems are constantly under pressure from consumers to provide increased rendering performance. Thus, there exists a need for a system and method which could rasterize triangles with higher throughput rates.

SUMMARY OF THE INVENTION

A graphics system may be configured to operate on a collection of vertices to determine mappings from an initial ordering to secondary and tertiary ordering. The initial order corresponds to the ordering of the vertices in an input buffer. The secondary (tertiary) ordering corresponds to the ordering of the vertices along a triangle major (minor) axis. The graphics system may compute horizontal and vertical displacements along edges of the triangle in the initial ordering, and use the signs of the horizontal displacements and vertical displacements to access one or more mapping tables which determine the mappings. The mappings may be used to rasterize the triangle in terms of pixels (or samples).

In one set of embodiments, the graphics system comprises a buffer memory, a presetup unit and a setup unit. The presetup unit may be configured to compute a horizontal edge displacement and a vertical edge displacement for each edge of a triangle in response to receiving the three vertices defining the triangle. The presetup unit may identify a major displacement as the larger of the horizontal edge displacement and vertical edge displacement for each edge, identify a controlling edge as that edge of the triangle which has the largest major displacement, and identify a major axis coordinate as the coordinate (i.e. horizontal or vertical coordinate) corresponding to the major displacement of the controlling edge. In other words, the major axis coordinate is the horizontal (vertical) coordinate if the horizontal edge displacement of the controlling edge is larger (smaller) than the vertical displacement of the controlling edge.

The presetup unit determines a first ordering code corresponding to the ordering of the vertices with respect to the major axis coordinate in response to the signs of the corresponding edge displacements (i.e. the edge displacements along the major axis coordinate). In addition, the presetup unit may determine a second ordering code corresponding to the ordering of the vertices with respect to a coordinate complementary to the major axis coordinate in response to the signs of the edge displacements along the complementary coordinate. The first and second ordering codes may be determined by table lookup. The presetup unit may store the ordering codes, the vertices and the edge displacements in a buffer memory.

Setup unit accesses the vertices and edge displacements from the buffer memory according to the first ordering and the second ordering using the first and second ordering codes respectively, and computes the rate of change of image attributes (e.g. red, green, blue) with respect to the major axis coordinate and the complementary coordinate. These rates of change are referred to herein as axial ordinate rates, and the image attributes are referred to as ordinates.

The graphics system may further include a sample fill unit, a frame buffer and a pixel computation unit. The sample fill unit may identify a set of sample positions interior to the triangle, compute sample ordinate values (e.g. red, green, blue) for the interior sample positions using the axial ordinate values, and store the sample ordinate values in the frame buffer. The pixel computation unit may then filter the sample ordinate values to determine pixels values which form a displayable image. In one embodiment, the pixel values are stored in the frame buffer for subsequent display. In another embodiment, the pixel values are immediately converted to analog form and transmitted to a video output port (for display on one or more display devices). In some embodiments, pixel values may be provided to a display device in digital form.

BRIEF DESCRIPTION OF THE DRAWINGS

The foregoing, as well as other objects, features, and advantages of this invention may be more completely understood by reference to the following detailed description when read together with the accompanying drawings in which:

FIG. 6 is a block diagram for one embodiment of video output processor 24;

FIG. 8 is table illustrating the mapping of the sign bits of the three major axis edge displacements to major axis ordering codes T2J;

FIG. 9 is table illustrating the mapping of the sign bits of the three minor axis edge displacements to minor axis ordering codes T2N;

Figure 1:
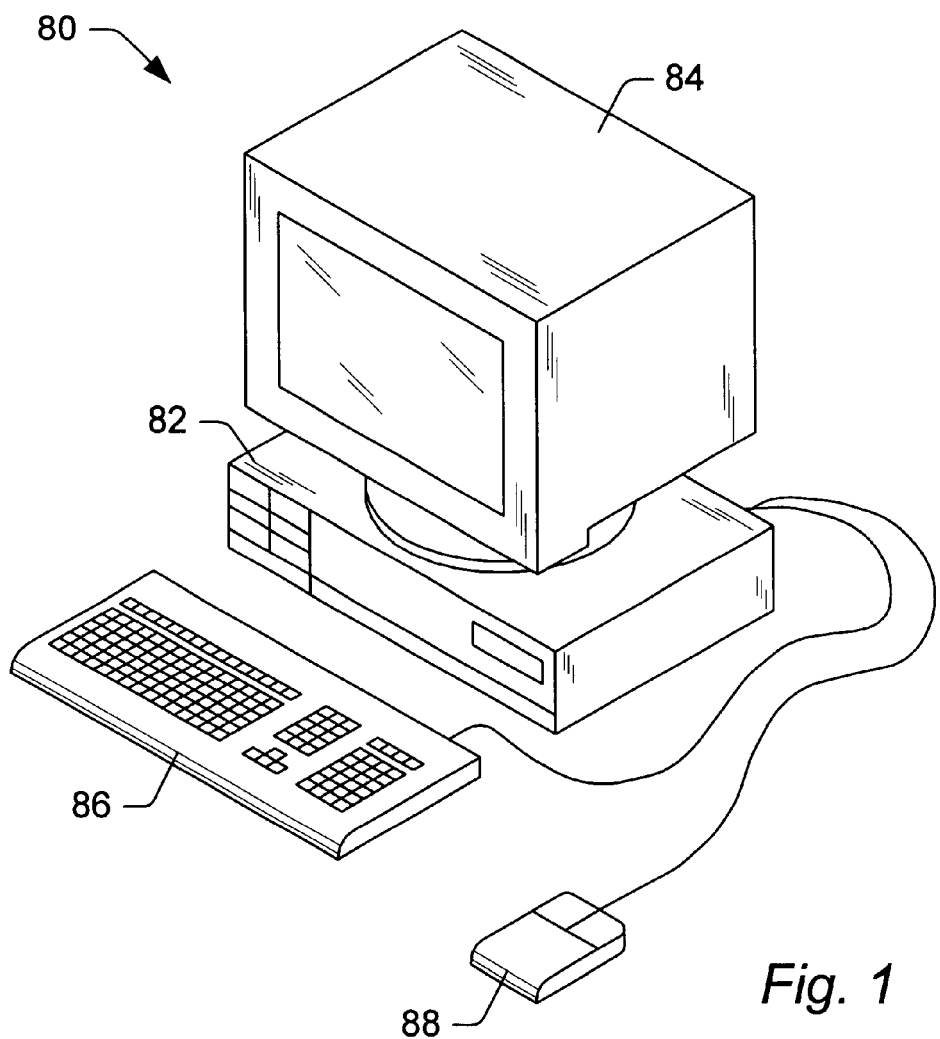
FIG. 1 illustrates one embodiment of a graphics system configured to perform 3D graphics computations for display of graphical object on a display device.

While the invention is susceptible to various modifications and alternative forms, specific embodiments thereof are shown by way of example in the drawings and will be described in detail herein. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims. Please note that the headings are for organizational purposes only and are not meant to limit the description or claims. The word "may" is used in this application in a permissive sense (i.e., having the potential to, being able to), not a mandatory sense (i.e., must). Similarly, the word "include", and derivations thereof, are used herein to mean "including, but not limited to."

DETAILED DESCRIPTION OF SEVERAL EMBODIMENTS

Computer System—FIG. 1

Referring now to FIG. 1, one embodiment of a computer system 80 that includes a graphics system is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
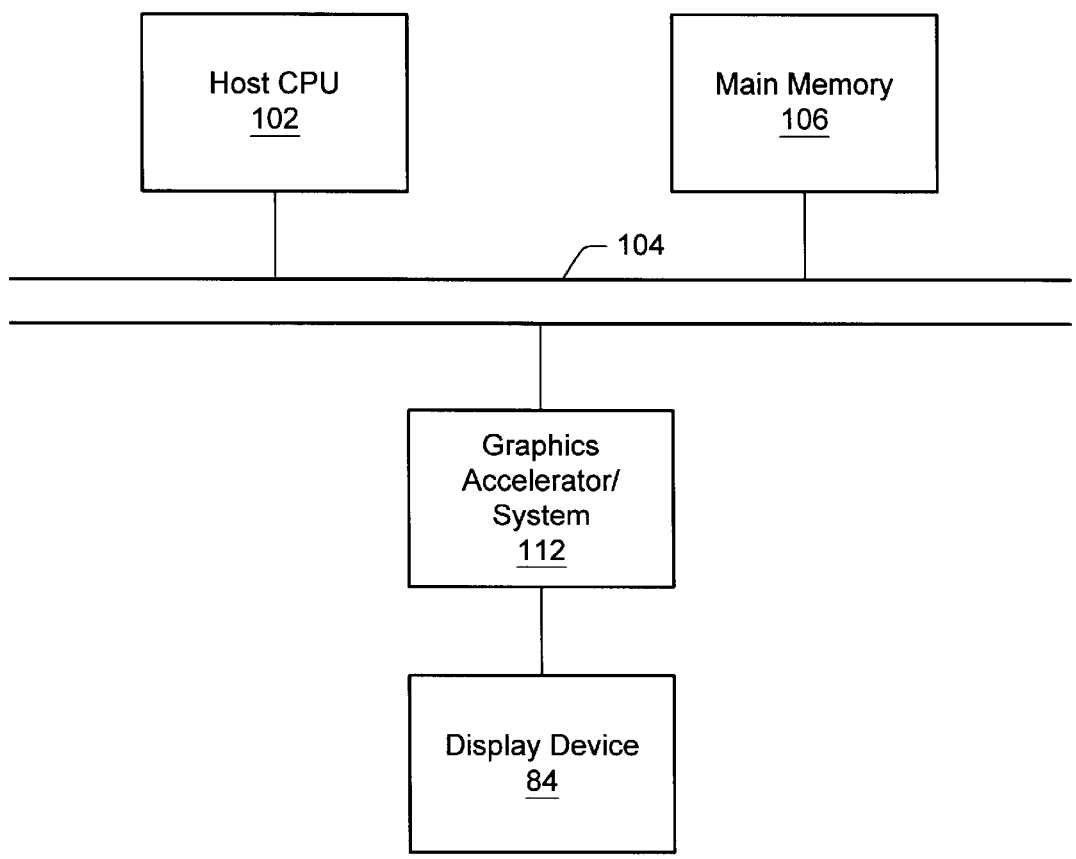
FIG. 2 is a block diagram for one embodiment of computer system 80.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/ output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
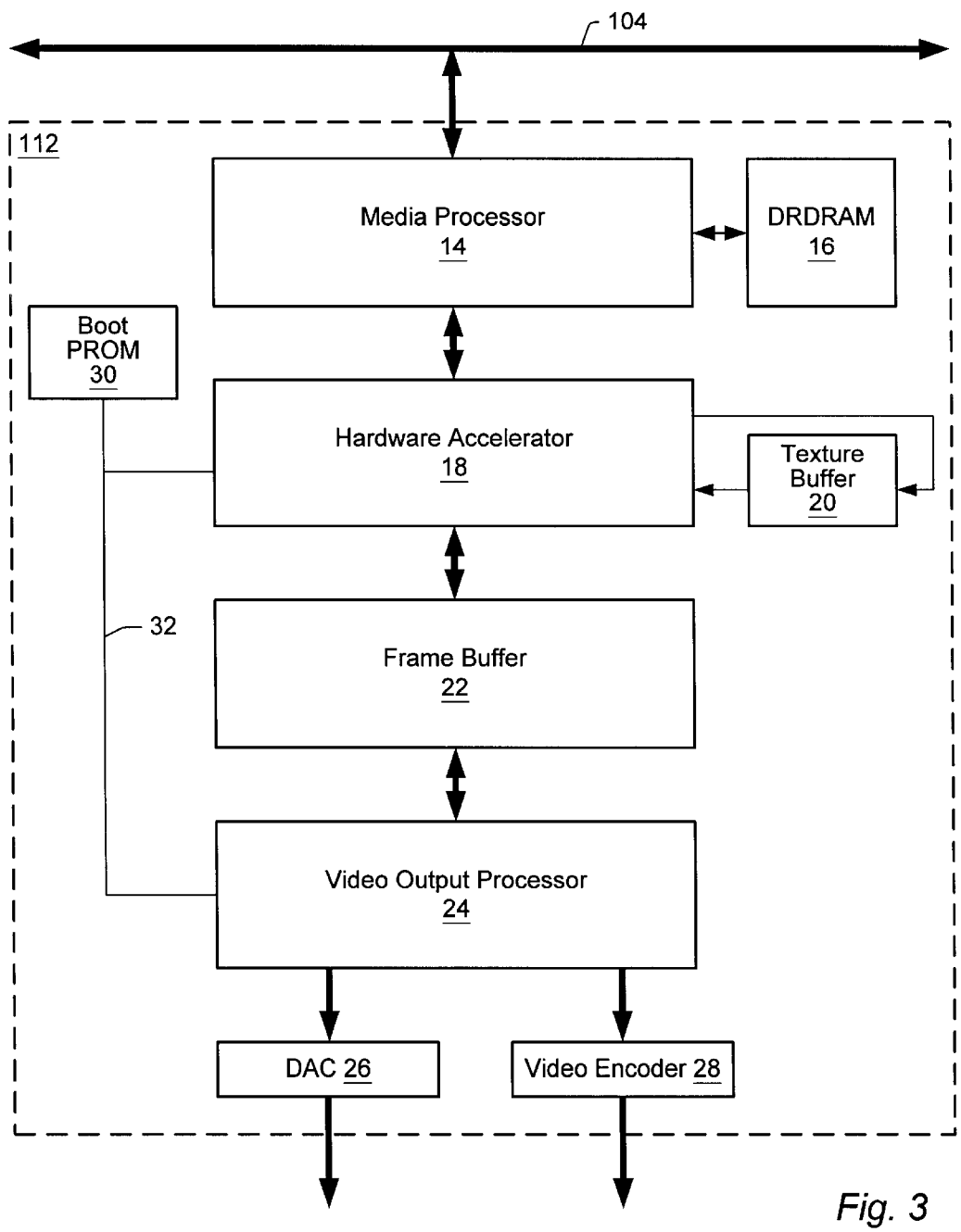
FIG. 3 is a block diagram for one embodiment of a graphics system configured to generate one or more video streams in response to received graphics data.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bidirectional bus.

Each functional block of graphics system 112 is described in more detail below.

Figure 4:
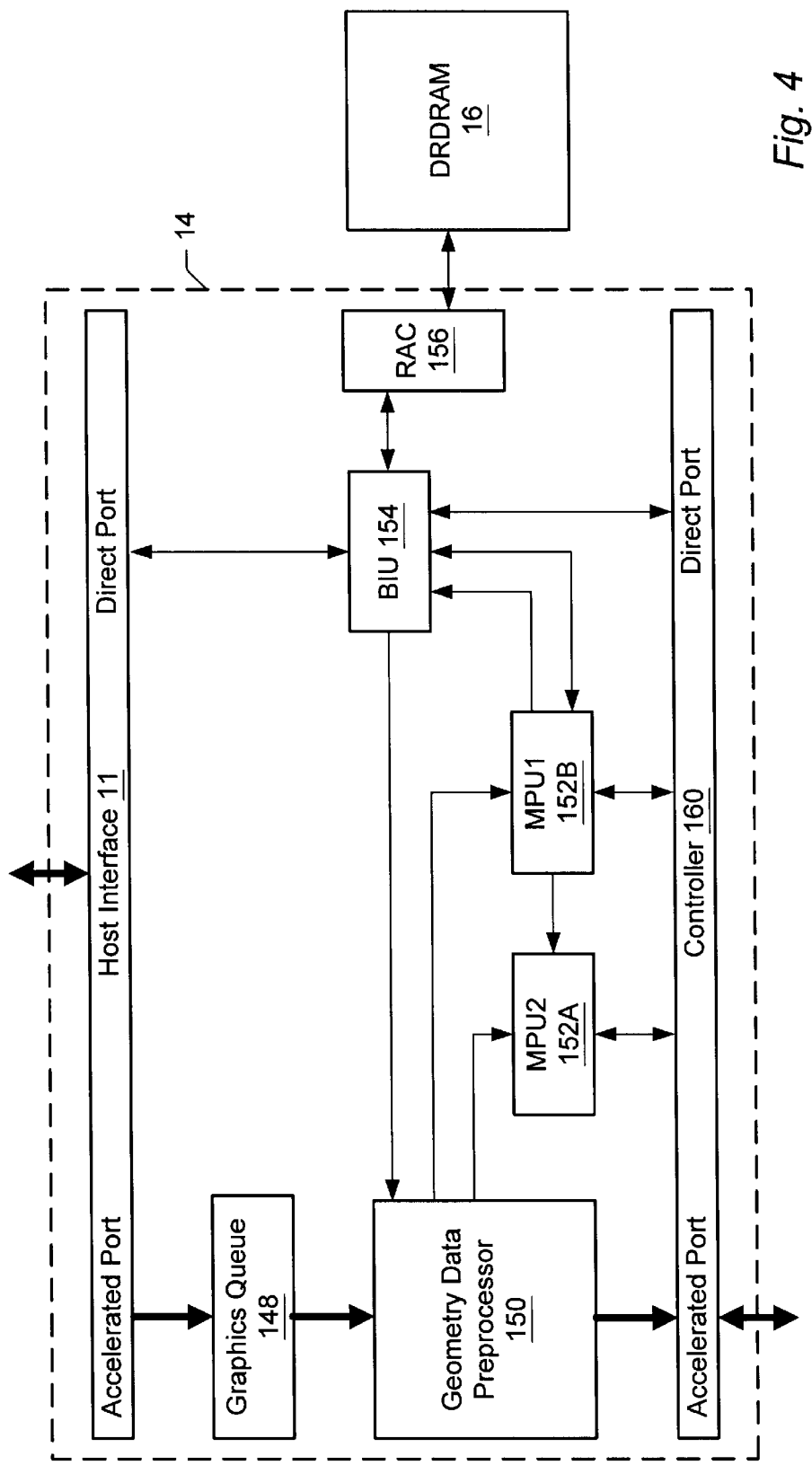
FIG. 4 is a block diagram for one embodiment of media processor 14.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
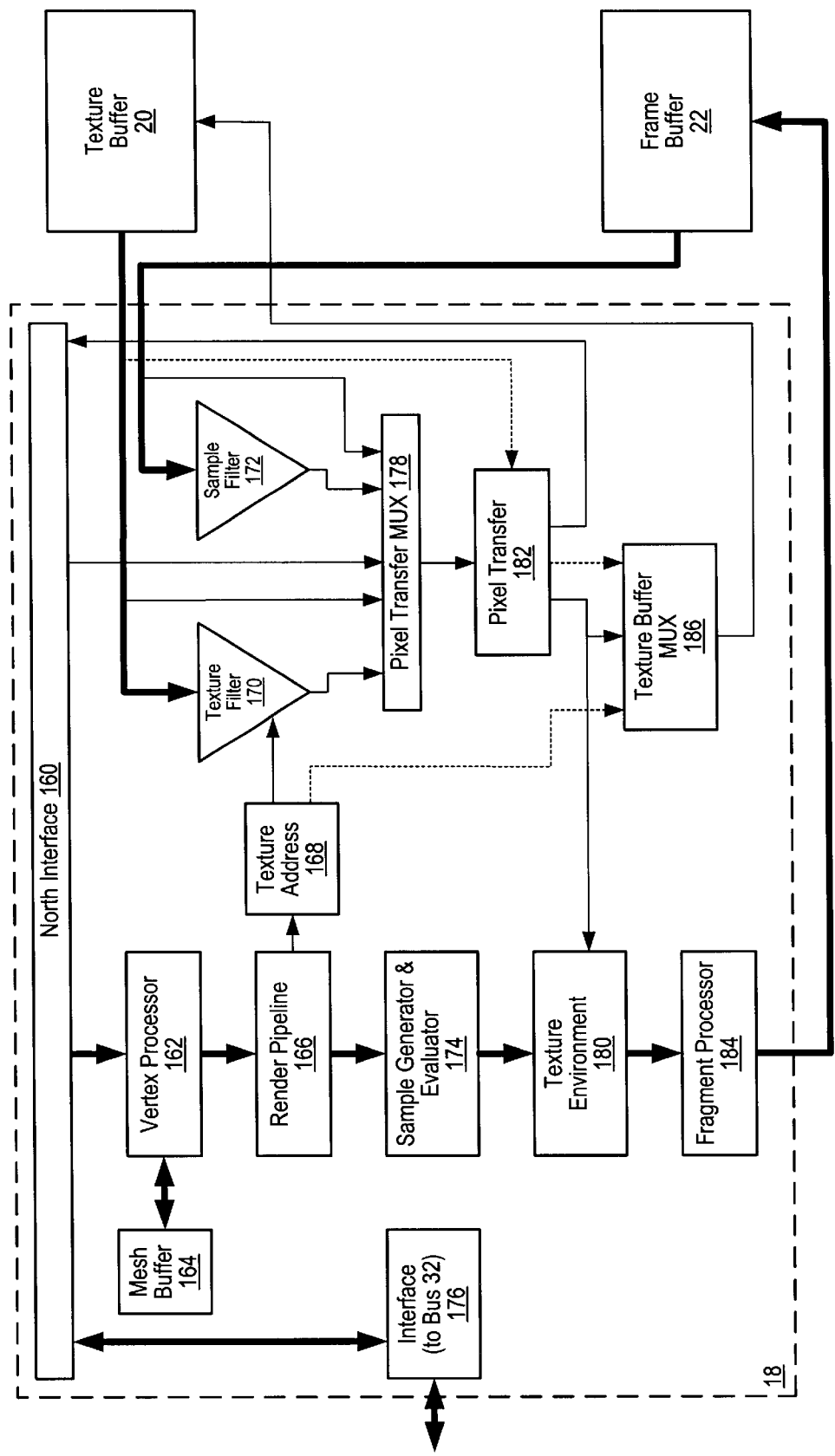
FIG. 5 is a block diagram for one embodiment of hardware accelerator 18.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); α (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Triangle Rasterization

Figure 7A:
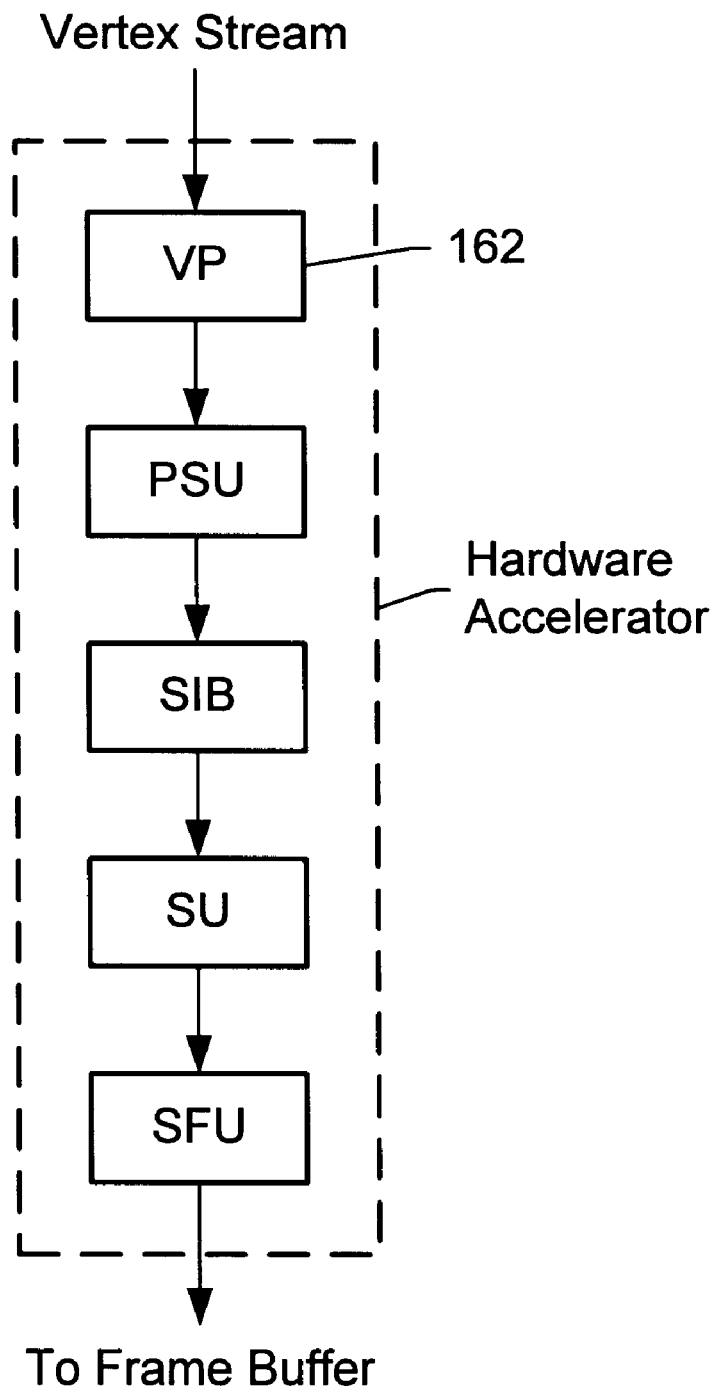
FIG. 7A is a block diagram for one embodiment of hardware accelerator 18.
Figure 7B:
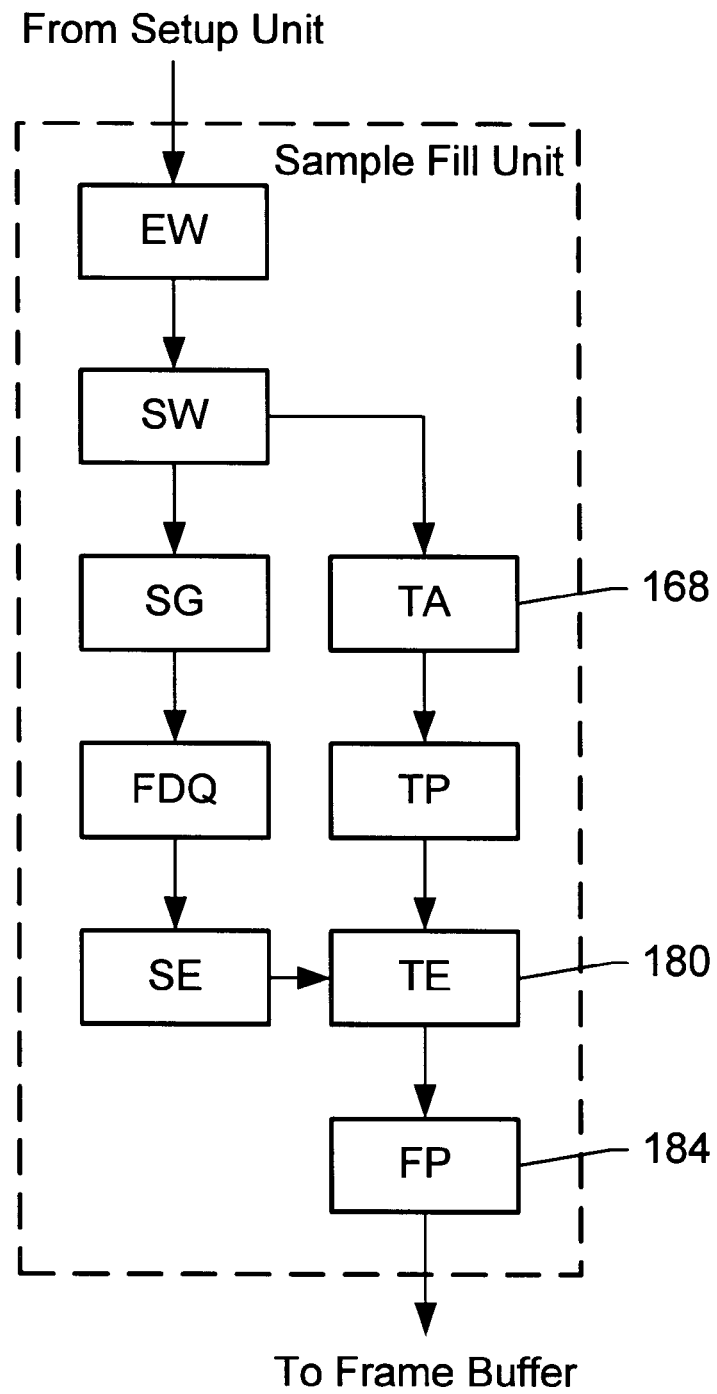
FIG. 7B is block diagram for one embodiment of sample fill unit SFU.

Hardware accelerator 18 may include various rendering resources such as a vertex processor 162, a presetup unit PSU, setup input buffer SIB, a setup unit SU and a sample fill unit SFU as shown in FIG. 7A. In one embodiment, the sample fill unit SFU may comprise an edge walker EW, a span walker SW, a sample generator SG, a Fragment Delay Queue FDQ, a sample evaluator SE and a fragment processor 184 as shown in FIG. 7B. Sample fill unit SFU may also include texture processing resources, e.g., a texture address 168, texture pipe TP and a texture environment 180.

Vertex processor 162 may receive a stream of vertices (i.e. vertex data structures) from media processor 14 through the North interface 160. Vertex processor 162 may accumulate and sort the vertices that define a drawing primitive, and perform a clip test on the primitive if necessary.

Vertex processor 162 may identify a group of vertices $V_1$, $V_2$, $V_3$ which define a triangle, and may make these vertices available to presetup unit PSU. (In some embodiments, hardware accelerator may include two or more presetup units to operate on multiple triangles in parallel.) Each vertex (i.e. vertex data structure) comprises x and y screen space coordinates, i.e. $V_1=(x_1,y_1)$, $V_2=(x_2,y_2)$, $V_3=(x_3,y_3)$. In addition, each vertex may include a vector of ordinate values (e.g. red, green, blue, alpha, and z).

Presetup unit PSU may calculate horizontal and vertical edge displacements for each edge of the triangle:

$$dx_{12}=x_2-x_1,\ dy_{12}=y_2-y_1,$$

$$dx_{23}=x_3-x_2,\ dy_{23}=y_3-y_2,$$

$$dx_{13}=x_3-x_1,\ dy_{13}=y_3-y_1;$$

and reciprocals of these displacements:

$$Dx_{12}=1/(dx_{12}),\ Dy_{12}=1/(dy_{12}),$$

$$Dx_{23}=1/(dx_{23}),\ Dy_{23}=1/(dy_{23}),$$

$$Dx_{13}=1/(dx_{13}),\ Dy_{13}=1/(dy_{13}).$$

The x and y displacements may be interpreted as the x and y components of vector displacements $$d_{12}=V_2-V_1,$$

$$d_{23}=V_3-V_2,$$

$$d_{13}=V_3-V_1,$$

i.e. one vector displacement for each edge of the triangle. Observe that the sign bit of x displacement $dx_{ik}$ determines whether vector displacement $d_{ik}$ lies in the right or left half planes of the coordinate plane, and the sign bit of y displacement $dy_{ik}$ determines whether the vector displacement $d_{ik}$ lies in the upper or lower half planes. The notation $d_{ik}$ is intended to represent an arbitrary one of the displacements $d_{12}$, $d_{23}$ or $d_{13}$.

Presetup unit PSU may further determine whether each edge is X major or Y major. An edge is said to be X major if the absolute value of its x displacement is larger than the absolute value of its y displacement. Conversely, an edge is said to be Y major if the absolute value of its x displacement is less than the absolute value of its y displacement. (An edge may be declared to be X major when the absolute value of the x displacement and the absolute value of the y displacement are equal. However, this choice is arbitrary.)

Thus, for each edge $E_{ik}$ of the given triangle, presetup unit PSU may compute the absolute value of x displacement $dx_{ik}$ and the absolute value of the y displacement $dy_{ik}$, i.e.

$$W_{12}=|dx_{12}|, H_{12}=|dy_{12}|,$$

$$W_{23}=|dx_{23}|, H_{12}=|dy_{23}|,$$

$$W_{13}=|dx_{13}|, H_{13}=|dy_{13}|.$$

$W_{ik}$ denotes the width of edge $E_{ik}$, and $H_{ik}$ denotes the height of edge $E_{ik}$. (Edge $E_{ik}$ corresponds to vector displacement $d_{ik}$.) For each edge $E_{ik}$, presetup unit PSU may subtract the edge height from the edge width to generate a width-in-excess-of-height size differential $\Delta U_{ik}=|dx_{ik}|-|dy_{ik}|$, and set a major axis identification flag associated with edge $E_{ik}$ based on the sign bit of the size differential:

$$\text{MajorAxis}_{ik}=\text{sign}(\Delta U_{ik}).$$

Thus, a major axis identification flag value of zero corresponds to an X major edge, and a major axis identification flag value of one corresponds to a Y major edge.

Each edge is said to have a major axis and a minor axis. If an edge is X major, the x axis is said to be its major axis and the y axis is said to be its minor axis. If the edge is Y major, the y axis is said to be its major axis and the x axis is said to be its minor axis.

Let j and n denote the major axis coordinate and minor axis coordinate for an edge $E_{ik}$, i.e. j=x and n=y if the edge is X major, and j=y and n=x if the edge is Y major. Thus, the notation $dj_{ik}$ represents the coordinate displacement for edge $E_{ik}$ along the major axis, and $dn_{ik}$ represents the coordinate displacement for the edge $E_{ik}$ along the minor axis. In other words, $dj_{ik}=dx_{ik}$ and $dn_{ik}=dy_{ik}$ if the edge $E_{ik}$ is X major, and $dj_{ik}=dy_{ik}$ and $dn_{ik}=dx_{ik}$ if the edge $E_{ik}$ is Y major.

In addition, presetup unit PSU may perform computations to determine which edge has the largest major axis displacement, i.e. the edge $E_{ik}$ on which the absolute value $|dj_{ik}|$ of the major axis displacement is maximized. The maximizing edge is referred to herein as the controlling edge. The triangle is said to be X dominant (Y dominant) if the controlling edge is X major (Y major). Define a major axis and a minor axis for the triangle as a whole in agreement with the major axis and the minor axis of the controlling edge. Let J and N denote respectively the major axis and minor axis coordinates of the triangle. In other words, J=x and N=y if the controlling edge is X major, and J=y and N=x if the controlling edge is Y major. Thus, the vertices of the triangle may be represented in terms of the triangle major axis coordinate J and triangle minor axis coordinate N, i.e. $V_1=(J_1,N_1)$, $V_2=(J_2,N_2)$, $V_3=(J_3,N_3)$. Similarly, the edges displacements of the triangle may be so represented, i.e. $d_{12}=(dJ_{12},dN_{12})$, $d_{23}=(dJ_{23},dN_{23})$, $d_{13}=(dJ_{13},dN_{13})$.

Observe that there are six one-to-one mappings from the set {1,2,3} to itself. Let Q denote the particular mapping of the six mappings which corresponds to the ordering of the vertices along the triangle major axis, i.e.

$$J_{Q(1)} \leq J_{Q(2)} \leq J_{Q(3)}.$$

The vertices $V_{Q(1)}$, $V_{Q(2)}$ and $V_{Q(3)}$ are referred to herein as the Start (S), Middle (M) and End (E) vertices respectively. Let S=Q(1), M=Q(2) and E=Q(3). Thus, the above inequality system may be equivalently expressed in terms of the new notation as $$J_S \leq J_M \leq J_E.$$

Let R denote the particular mapping of the six mappings which corresponds to the ordering of the vertices along the triangle minor axis, i.e.

$$N_{R(1)} \leq N_{R(2)} \leq N_{R(3)}.$$

The vertices $V_{R(1)}$, $V_{R(2)}$ and $V_{R(3)}$ are referred to herein as the Head, Center and Tail vertices respectively. Let H=R(1), C=R(2) and T=R(3). Thus, the above inequality system may be equivalently expressed in terms of the new notation as $$N_H \leq N_C \leq N_T.$$

Presetup unit PSU stores vertex data into setup input buffer SIB in vertex order $V_1$, $V_2$, $V_3$. However, setup unit SU employs rendering algorithms which need to know the orderings of the vertices as seen along the triangle major axis and triangle minor axis. Thus, setup unit SU needs to know the mappings Q and R to properly access vertex data from setup input buffer SIB.

Furthermore, presetup unit PSU may store edge data (e.g. the edge displacements and edge displacement reciprocals) into the setup input buffer SIB according to a standard ordering of the edges. For example, the standard ordering of the edges may be the ordering given by the sequence $E_{12}$, $E_{13}$, $E_{23}$. In other words, presetup unit PSU may store edge data into the setup input buffer SIB according to the list:

$$dj_{12}, dn_{12}, Dj_{12}, Dn_{12}, \text{MajorAxis}_{12},$$

$$dj_{13}, dn_{13}, Dj_{13}, Dn_{13}, \text{MajorAxis}_{13},$$

$$dj_{23}, dn_{23}, Dj_{23}, Dn_{23}, \text{MajorAxis}_{23}.$$

This list is referred to herein as the naïve edge data list (NEDL).

In contrast, the rendering algorithms employed by setup unit SU may need to operate on the values $$dj_{SM}=j_M-j_S$$

$$dn_{SM}=n_M-n_S$$

$$Dj_{SM}=1/(dj_{SM})$$

$$Dn_{SM}=1/(dn_{SM})$$

$$dj_{SE}=j_E-j_S$$

$$dn_{SE}=n_E-n_S$$

$$Dj_{SE}=1/(dj_{SE})$$

$$Dn_{SE}=1/(dn_{SE})$$

$$dj_{ME}=j_E-j_M$$

$$dn_{ME}=n_E-n_M$$

$$Dj_{ME}=1/(dj_{ME})$$

$$Dn_{ME}=1/(dn_{ME})$$

This collection of values is referred to herein as the major-relative edge data collection (MAJC). Observe that the values of the major-relative edge data collection are identical to the entries of the naïve edge data list up to possible sign change. The major axis ordering map Q determines how to access any of the MAJC values from the naïve edge data list. For example, if map Q is given by S=2, M=3, E=1, then $$dj_{SM} = j_M - j_S = j_3 - j_2 = dj_{23} \text{ and}$$

$$dj_{SE} = j_E - j_S = j_1 - j_2 = (-1)dj_{12}.$$

For every value of the MAJC, the map Q specifies a corresponding entry in the naïve edge data list and whether or not to apply a sign change.

Furthermore, in some embodiments, setup unit SU may also need to operate on some or all of the values $$dj_{HC} = j_C - j_H$$

$$dn_{HC} = n_C - n_H$$

$$Dj_{HC} = 1/(dj_{HC})$$

$$Dn_{HC} = 1/(dn_{HC})$$

$$dj_{HT} = j_T - j_H$$

$$dn_{HT} = n_T - n_H$$

$$Dj_{HT} = 1/(dj_{HT})$$

$$Dn_{HT} = 1/(dn_{HT})$$

$$dj_{CT} = j_T - j_C$$

$$dn_{CT} = n_T - n_C$$

$$Dj_{CT} = 1/(dj_{CT})$$

$$Dn_{CT} = 1/(dn_{CT})$$

This collection of values is referred to herein as the minor-relative edge data collection (MINC). Observe that the values of the minor-relative edge data collection are identical to the entries of the naïve edge data list up to possible sign change. The minor axis ordering map R determines how to access any of the MINC values from the naïve edge data list. For example, if map R is given by H=1, C=3, T=2, then $$dj_{HC} = j_C - j_H, j_3 - j_1 = dj_{13} \text{ and}$$

$$dj_{CT} = j_T - j_C = j_2 - j_3 = (-1)dj_{23}.$$

For every value of the MINC, the map R specifies a corresponding entry in the naïve edge data list and whether or not to apply a sign change.

In one set of embodiments, presetup unit PSU may use the sign bits of the triangle major axis edge displacements $dJ_{12}$, $dJ_{13}$ and $dJ_{23}$ to lookup (or compute) a three-bit code denoted T2J for the major-axis order mapping Q as shown in FIG. 8. The notation [q] denotes the sign bit of the quantity q. Observe that the last two states of the sign bit vector ([$dJ_{12}$], [$dJ_{13}$], [$dJ_{23}$]) are not realizable, and thus, have no associated entry information. For each realizable state of the sign bit vector, the table of FIG. 8 lists:

(a) the indices of the vertices in the vertex order $V_1$, $V_2$, $V_3$ which correspond to S, M and E respectively;

(b) the edges Eik (where i and k are indices of the vertex ordering) which correspond to the edges $E_{SE}$, $E_{SM}$ and $E_{ME}$ respectively; and (c) the three-bit major axis map code T2J.

The notation $E_{SE}$ denotes the directed edge from vertex $V_S$ to vertex $V_E$. Similarly, the notation Eik denotes the directed edge from vertex $V_i$ to vertex $V_k$. Thus, Eki=(-1)Eik.

Furthermore, presetup unit PSU may use the sign bits of the triangle minor axis edge displacements $dN_{12}$, $dN_{13}$ and $dN_{23}$ to lookup (or compute) a three-bit code denoted T2N for the minor-axis order mapping R as shown in FIG. 9. Observe that the last two states of the sign bit vector ([$dN_{12}$], [$dN_{13}$], [$dN_{23}$]) are not realizable, and thus, have no associated entry information. For each realizable state of the sign bit vector, the table of FIG. 9 lists:

(a) the indices of the vertices in the vertex order $V_1$, $V_2$, $V_3$ which correspond to H, C and T respectively;

(b) the edges Eik (where i and k are indices of the vertex ordering) which correspond to the edges $E_{HC}$, $E_{HT}$ and $E_{CT}$ respectively; and (c) the three-bit minor axis map code T2N.

The notation $E_{HC}$ denotes the directed edge from vertex $V_H$ to vertex $V_C$. Edges $E_{HT}$ and $E_{CT}$ are similarly interpreted.

Observe that the mapping of input states to output states given by the table of FIG. 9 is identical to the table of FIG. 8. Thus, presetup unit PSU may employ a single lookup table to determine the major axis map code T2J and the minor axis map code T2N. To access the major axis map code T2J, the sign bits of the triangle major axis edge displacements $dJ_{12}$, $dJ_{13}$ and $dJ_{23}$ are used to address the lookup table. To access the minor axis map code T2N, the sign bits of the triangle minor axis edge displacements $dN_{12}$, $dN_{13}$ and $dN_{23}$ are used to address the lookup table.

In some embodiments, the assignment of three-bit binary codes to input states may differ for the major axis map code T2J and minor axis map code T2N. Thus, presetup unit PSU may include separate lookup tables for the major axis code and the minor axis code.

Presetup unit PSU may write a primitive instruction corresponding to the current triangle into the setup input buffer SIB. The primitive instruction may include the major axis map code T2J and the minor axis map code T2N as well as other control bits.

Setup unit SU computes parameters necessary for the operation of sample fill unit SFU. Sample fill unit SFU computes ordinate values (e.g. red, green, blue) for samples interior to triangles based on the parameters supplied by the setup unit SU, and stores the sample ordinate values in frame buffer 22.

Figure 10A:
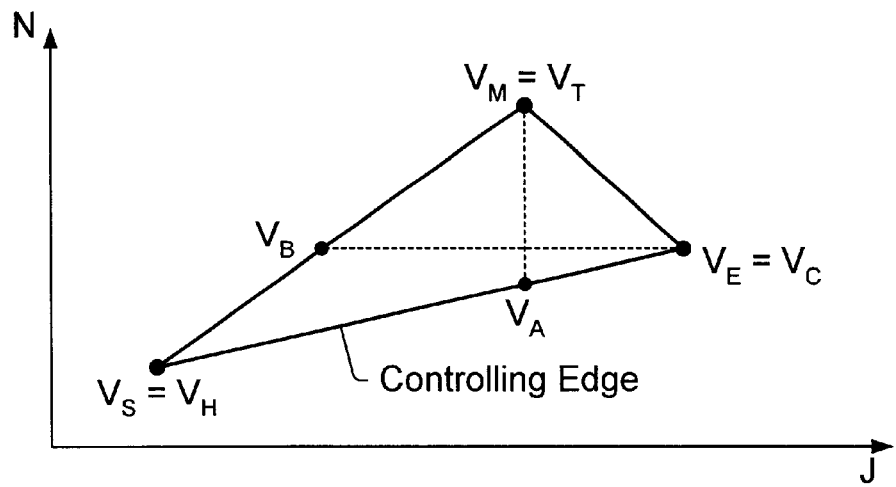
FIGS. 10A and 10B present two example triangles, and the projections associated with one embodiment of a computational algorithm employed by setup unit SU.
Figure 10B:
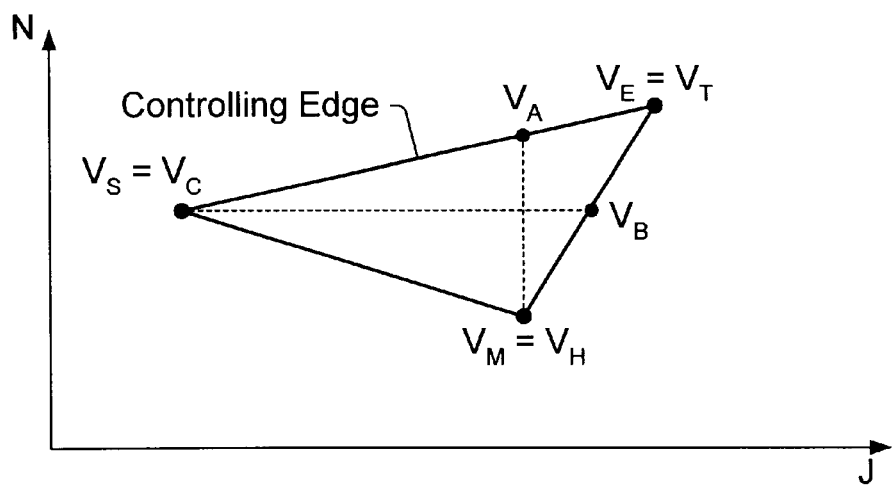

In one set of embodiments, setup unit SU projects the vertex $V_M$ having the intermediate position along the triangle major axis J onto the controlling edge to obtain a primary projection point $V_A$. The projection is along the triangle minor axis direction N. Similarly, setup unit SU projects the vertex $V_C$ having the intermediate position along the triangle minor axis onto the opposite edge (i.e. edge $V_H V_T$) to obtain a secondary projection point $V_B$. This projection is along the triangle major axis direction. FIGS. 10A and 10B illustrate the projections for two particular triangles.

Each triangle vertex $V_k$ has an associated vector $H_k$ of ordinate values typically including red, green, blue, and perhaps other attributes such as alpha and z depth. Let $C_k$ denote an arbitrary one of the ordinate values in ordinate vector $H_k$.

An ordinate value $C_A$ may be interpolated for primary projection point $V_A$ based on the ordinate values $C_S$ and $C_E$ associated respectively with vertices $V_S$ and $V_E$ at the ends of the controlling edge. The difference in triangle minor axis coordinate N and the difference in the ordinate value C between the vertex $V_M$ and primary projection point $V_A$ may be used to compute a minor axis rate of change dC/dN for the ordinate value C. Similarly, an ordinate value $C_B$ may be interpolated for the secondary projection point $V_B$ based on the ordinate values $C_H$ and $C_T$ associated respectively with vertices $V_H$ and $V_T$. The difference in the triangle major axis coordinate J and the difference in the ordinate value C between the vertex $V_C$ and the secondary projection point $V_B$ may be used to compute a major axis rate of change dC/dJ for the ordinate C. The axial rates dC/dJ and dC/dN for each ordinate value C may be provided to sample fill unit SFU.

Sample fill unit SFU may generate sample positions in a local region (e.g. a bounding rectangle) containing the triangle, test the sample positions to determine which of the sample positions reside interior to the current triangle, and assign sample ordinate values (e.g. red, green, blue) at each of the interior sample positions.

In one set of embodiments, sample fill unit SFU may use the axial rates dC/dJ and dC/dN to compute an ordinate value $C_{sample}$ for each sample residing inside the triangle according to the relation $$C_{sample}=(dC/dJ)(J_{sample}-J_{root})+(dC/dN)(N_{sample}-N_{root})+C_{root}$$

where $(J_{sample},N_{sample})$ defines the sample position in the J-N coordinate system, and $C_{root}$ is an ordinate value corresponding to the root position $(J_{root},N_{root})$.

Figure 11:
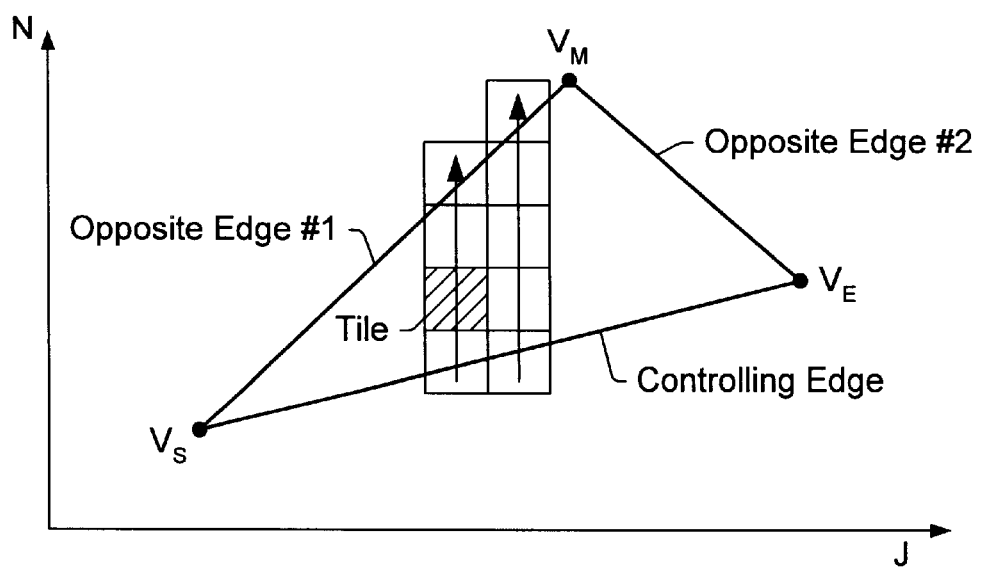
FIG. 11 illustrates one embodiment of a tile walking algorithm for rendering triangles.

Sample fill unit SFU may employ a tile walking algorithm for filling the triangle with samples. The tile may traverse the triangle in the triangle minor axis direction from the controlling edge to an opposite edge as suggested by FIG. 11. The trajectory of the tile as it moves from the controlling edge to the opposite edge is referred to herein as a span. After completing a current span, the tile then restarts on the next span displaced one tile width in triangle major axis direction. The first span may be defined by the vertex $V_S$. The last span may be defined by the vertex $V_E$. In an alternative embodiment, the tiles move along spans in the reverse direction, i.e. from the opposite edge to the controlling edge. The edge walker EW generates the coordinates of points on the controlling edge and opposite edge that define the start and end of each span. The span walker SW is responsible for moving the tile within each span.

Within each tile along a span, sample generator SG may generate a set of sample positions, and may determine which of the sample positions reside interior to the triangle. The interior sample positions are referred to herein as "valid" sample positions.

The sample evaluator SE may perform the computation of the sample ordinate values for each valid sample position. The values $C_{root}$, $J_{root}$ and $N_{root}$ may be updated as the tile moves along a span, and from one span to the next.

Figure 12:
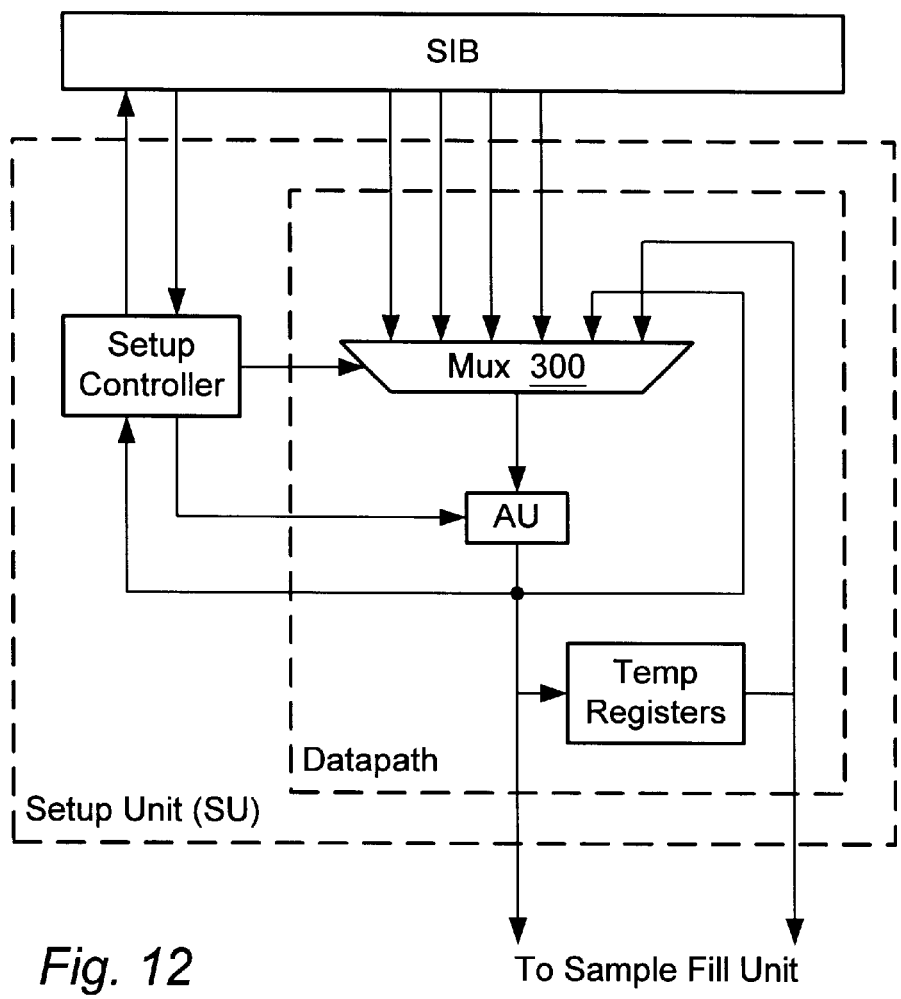
FIG. 12 illustrates a block diagram of one embodiment of setup unit SU.

Setup unit SU may comprise a setup controller and a datapath as illustrated in FIG. 12. The datapath may include a multiplexor 300, an arithmetic unit AU and a set of temporary registers. The setup controller may read a primitive instruction corresponding to the current triangle from the setup input buffer SIB, and assert control signals which drive multiplexor 300 and arithmetic unit AU through a series of computational cycles. The arithmetic unit may include a set of adders, multipliers, a reciprocal unit and a division unit.

Multiplexor 300 may receive the vertex and edge data values corresponding to the current triangle from the setup input buffer SIB. As described above, presetup unit PSU stores the vertex data values into the setup input buffer according to vertex ordering $V_1$, $V_2$, $V_3$, and stores the edge data values into the setup input buffer according to a standard ordering as exemplified by the naïve edge data list (NEDL). However, recall that setup unit SU operates on vertex data and edge data according to triangle major axis ordering and/or triangle minor axis ordering. Multiplexor 300 provides the vertex and/or edge data values needed by the arithmetic unit in each computational cycle in response to control signals asserted by the setup controller. The setup controller generates the control signals based on the values of the major axis map code T2J and the minor axis map code T2N and the index (indices) of the required operand(s). For example, if arithmetic unit AU needs operand $dj_{SE}$ in a given computational cycle, the setup controller asserts control signals that induce transmission of one of the values $dj_{12}$, $dj_{13}$, $dj_{23}$ from the input of multiplexor 300 to the output of multiplexor 300 based on the major axis map code T2J. If arithmetic unit AU needs operand $dj_{HT}$ in a given computational cycle, the setup controller asserts control signals that induce transmission of one of the values $dj_{12}$, $d_{13}$, $dj_{23}$ from the input of multiplexor 300 to the output of multiplexor 300 based on the minor axis map code T2J. It is noted multiplexor 300 may be configured to generate two or more outputs in parallel depending on the particular hardware implementation. Alternatively, multiplexor 300 may only generate one output per computational cycle.

It is noted that setup unit SU may comprise multiple setup controllers and datapaths operating in parallel. Each setup controller may be configured to control one of the datapaths.

Figure 13:
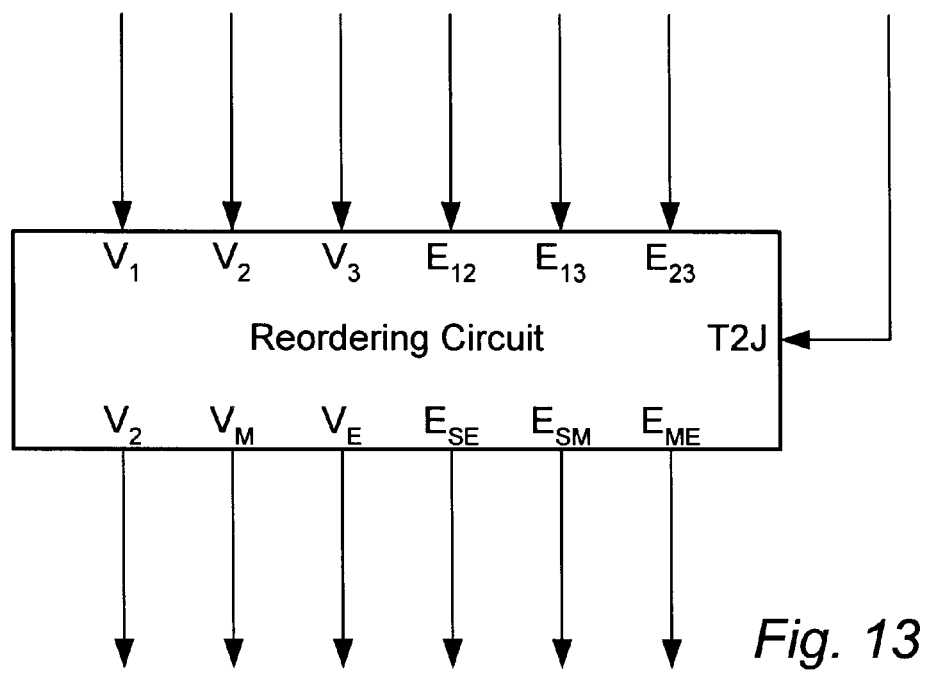
FIG. 13 illustrates one embodiment of a reordering circuit which reorders input operands in response to the major axis ordering code T2J.

In one set of alternate embodiments, setup unit SU may include a reordering circuit which performs a reordering of vertex and edge data operands according to the table of FIG. 8. The three-bit code T2J controls the reordering circuit as illustrated in FIG. 13. The reordering circuit may receive one operand (or N operands where N is positive integer) for each of vertices $V_1$, $V_2$ and $V_3$ from the setup input buffer SIB, and one operand (or M operands where M is a positive integer) for each of edges $E_{12}$, $E_{13}$ and $E_{23}$ from the setup input buffer SIB, and may present the operands in the ordering $V_S$, $V_M$, $V_E$ for the vertex operands, and the ordering $E_{SE}$, $E_{MS}$, $E_{ME}$ for the edge operands. For example, in one computational cycle, the reordering circuit may receive operands $j_1$, $j_2$, $j_3$, $dj_{12}$, $dj_{13}$, $dj_{23}$, and generate $j_S$, $j_M$, $j_E$, $dj_{SE}$, $dj_{MS}$ and $dj_{ME}$ as output operands. In another computational cycle, the reordering circuit may receive operands $n_1$, $n_2$, $n_3$, $dn_{12}$, $dn_{13}$, $dn_{23}$, and generate $n_S$, $n_M$, $n_E$, $dn_{SE}$, $dn_{MS}$ and $dn_{ME}$ as output operands.

Furthermore, the reordering circuit may be used to implement the reordering of FIG. 9. The reordering circuit may be operated in a time-shared fashion, i.e. it may perform the major axis reordering in response to the code T2J of FIG. 8 in a first set of computational cycles, and may perform the minor axis reordering in response to the code T2N of FIG. 9 in a second set of computational cycles.

In one of the alternative embodiments, setup unit SU may include a second reordering circuit dedicated for the minor-axis reordering and responsive to the code T2N. Thus, the first reordering circuit and second reordering circuit may operate in parallel.

Sample Filtering

As described above, hardware accelerator 18 includes sample filter 172. Sample filter 172 is configured to read sample ordinate values (e.g. red, green, blue) from frame buffer 22, to filter the sample ordinate values to generate pixel values, and to store the pixel values in frame buffer 22. (Separate buffer segments may be maintained within frame buffer 22 for sample ordinate data and pixel data.) Video output processor 24 may read the pixel values from frame buffer 22, generate one or more video signals in response to the pixel values, and provide the one or more video signals to one or more display devices.

Sample filter 172 may perform a spatial convolution on sample ordinate values using a discrete convolution filter. In one alternative embodiment, sample filter 172 is a separate circuit located external to the hardware accelerator.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system for rendering an image on a display device, the graphics system comprising:
   a buffer memory;
   a first unit configured to (a) receive three vertices corresponding to a triangle, (b) compute edge displacements for each edge of the triangle based on the three vertices, (c) determine a first ordering code and a second ordering code corresponding respectively to a first ordering and a second ordering of the vertices and edge displacements in response to sign bits of the edge displacements, (d) store the vertices, edge displacements, first ordering code and second ordering code in the buffer memory; and
   a second unit configured to access and operate on said vertices and edge displacements from the buffer memory to determine axial ordinate rate values for the triangle, wherein said second unit accesses said vertices and edge displacements from the buffer memory according to the first and second orderings using the first and second ordering codes respectively;
   wherein said axial ordinate rate values are usable to determine a portion of a displayable images;
   wherein said edge displacements include a horizontal edge displacement of a horizontal coordinate and a vertical edge displacement of a vertical coordinate for each edge, wherein, for each edge, the first unit is further configured to:
   identify a major axis displacement for each edge as the larger of the horizontal edge displacement or the vertical edge displacement of the edge;
   determine a controlling edge among the three edges of the triangle as the edge having a largest of the major axis displacements;
   wherein the first ordering is an ordering of the vertices with respect to the horizontal coordinate and the second ordering is an ordering of the vertices with respect to the vertical coordinate if the horizontal edge displacement of the controlling edge is larger than the vertical edge displacement of the controlling edge.

2. The graphics system of claim 1 further comprising:
   a sample fill unit configured to receive the axial ordinate rate values from the second unit, and to generate samples for the triangle using the axial ordinate rate values;
   a frame buffer configured to store the samples;
   a pixel computation unit configured to read and filter said samples from the frame buffer to generate a pixel value, wherein the pixel value defines said portion of the displayable image.

3. The graphics system of claim 2, wherein the first unit, the second unit and the sample fill unit are configured within a common integrated circuit chip.

4. The graphics system of claim 3, wherein the filtering unit is also configured within the common integrated circuit chip.

5. The graphics system of claim 1, wherein (c) comprises determining the first ordering code in response to said signs of the horizontal edge displacements if the horizontal edge displacement of the controlling edge is larger than the vertical edge displacement of the controlling edge.

6. The graphics system of claim 1, wherein (c) comprises determining the second ordering code in response to signs of the vertical edge displacements if the horizontal edge displacement of the controlling edge is larger than the vertical edge displacement of the controlling edge.

7. The graphics system of claim 1, wherein (c) comprises determining the first and second ordering code by accessing a lookup table using the signs of the edge displacements.

8. The graphics system of claim 1, wherein the second unit comprises a controller unit, a multiplexor and an arithmetic unit, wherein the multiplexor is configured to receive said vertices and edge displacements from the buffer memory and to provide one or more of said vertices and edge displacements according to the first and second ordering to the arithmetic unit in one or more computational cycles in response to control signals asserted by the control unit.

9. The graphics system of claim 8, wherein the control unit is configured to read the first and second ordering codes from the buffer memory and to assert said control signals in response to said first and second ordering codes.

10. A method for rendering an image on a display device, the method comprising:
    (a) receiving three vertices corresponding to a triangle;
    (b) computing edge displacements for each edge of the triangle based on the three vertices;
    (c) storing the vertices and edge displacements in a buffer memory;
    (d) determining a first ordering code and a second ordering code corresponding respectively to a first ordering and a second ordering of the vertices and edge displacements in response to sign bits of the edge displacements;
    (e) accessing said vertices and edge displacements according to the first ordering and second ordering from the buffer memory using respectively the first ordering code and second ordering code;
    (f) performing arithmetic operations on said vertices and edge displacements according to the first ordering and second ordering to generate samples for the triangle; and
    (g) filtering the samples to generate a pixel value, wherein the pixel value is usable to define a display image;
    wherein (b) comprises:
    computing a horizontal edge displacement of a horizontal coordinate and a vertical edge displacement of a vertical coordinate for each edge;
    identifying a major axis displacement for each edge as the larger of the horizontal edge displacement or the vertical edge displacement of the edge;
    determining a controlling edge among the three edges of the triangle as the edge having a largest of the major axis displacements;
    wherein the first ordering is an ordering of the vertices with respect to the horizontal coordinate and the second ordering is an ordering of the vertices with respect to the vertical coordinate if the horizontal edge displacement of the controlling edge is larger than the vertical edge displacement of the controlling edge.

11. The method of claim 10, wherein the first ordering is an ordering of the vertices with respect to the vertical coordinate and the second ordering is an ordering of the vertices with respect to the horizontal coordinate if the horizontal edge displacement of the controlling edge is smaller than the vertical edge displacement of the controlling edge.

12. The method of claim 10 wherein (d) comprises determining the first ordering code in response to said signs of the horizontal edge displacements if the horizontal edge displacement of the controlling edge is larger than the vertical edge displacement of the controlling edge.

13. The method of claim 10, wherein (d) comprises determining the second ordering code in response to signs of the vertical edge displacements if the horizontal edge displacement of the controlling edge is larger than the vertical edge displacement of the controlling edge.

14. The method of claim 10, wherein (d) comprises accessing a lookup table using the sign bits of the edge displacements.

15. The method of claim 10 wherein (e) comprises controlling a multiplexor through successive computational cycles to transmit selected subsets of said vertices and edge displacements according to the first ordering and second ordering from the buffer memory to an arithmetic unit in response to the first ordering code and second ordering code respectively.

16. The method of claim 10 wherein (f) comprises:
   computing a first axial rate of change of an image attribute in response to a first subset of said vertices and edges accessed from the buffer memory according to the first ordering using the first ordering code;
   computing a second axial rate of change of the image attribute in response to a second subset of said vertices and edges accessed from the buffer memory according to the second ordering using the second ordering code;
   determining a set of sample positions interior to the triangle;
   assigning values for the first image attribute to the interior sample positions using the first and second axial rates;
   wherein said samples for the triangle comprise said values of the first image attribute.

17. The method of claim 16 wherein said image attributes is selected from the group consisting of red, green, blue, alphas and z.

18. The method of claim 10 wherein (g) comprises performing a discrete convolution on the samples according to a convolution filter to generate the pixel value.

19. A method for rendering an image on a display device, the method comprising:

(a) receiving three vertices corresponding to a triangle;

(b) computing edge displacements for each edge of the triangle based on the three vertices;

(c) storing the vertices and edge displacements in a memory;

(d) determining a first ordering code and a second ordering code corresponding respectively to a first ordering and a second ordering of the vertices and the edge displacements in response to sign bits of the edge displacements;

(e) accessing the vertices and the edge displacements according to the first ordering and second ordering from the memory using respectively the first ordering code and the second ordering code;

(f) generating one or more pixel values for the triangle, wherein said generating one or more pixel values comprises performing arithmetic operations on the vertices and the edge displacements according to the first ordering and second ordering;

wherein (b) comprises:
   computing a horizontal edge displacement of a horizontal coordinate and a vertical edge displacement of a vertical coordinate for each edge;
   identifying a major axis displacement for each edge as the larger of the horizontal edge displacement or the vertical edge displacement of the edge;
   determining a controlling edge among the three edges of the triangle as the edge having a largest of the major axis displacements;
   wherein the first ordering is an ordering of the vertices with respect to the horizontal coordinate and the second ordering is an ordering of the vertices with respect to the vertical coordinate if the horizontal edge displacement of the controlling edge is larger than the vertical edge displacement of the controlling edge.

20. The method of claim 19, wherein said generating one or more pixel values comprises:
   performing the arithmetic operations on the vertices and the edge displacements according to the first ordering and second ordering to generate samples for the triangle; and
   filtering the samples to generate at least one pixel value, wherein the pixel value is usable to define a display image.

* * * * *

UNITED STATES PATENT AND TRADEMARK OFFICE
CERTIFICATE OF CORRECTION

PATENT NO. : 6,784,894 B2
DATED : August 31, 2004
INVENTOR(S) : Schimpf et al.

It is certified that error appears in the above-identified patent and that said Letters Patent is hereby corrected as shown below:

Column 17,
Line 33, please delete "images" and substitute -- image --.

Signed and Sealed this

Eighteenth Day of January, 2005

JON W. DUDAS
*Director of the United States Patent and Trademark Office*